United States Patent
Sanders et al.

(10) Patent No.: US 8,669,940 B1
(45) Date of Patent: *Mar. 11, 2014

(54) OPTICAL NAVIGATION SYSTEM USING A SINGLE-PACKAGE MOTION SENSOR

(75) Inventors: Steven Sanders, Belmont, CA (US);
John Frame, Arcadia, CA (US); Brian Todoroff, San Jose, CA (US); Yansun Xu, Mt. View, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/252,768

(22) Filed: Oct. 4, 2011

Related U.S. Application Data

(63) Continuation of application No. 12/009,863, filed on Jan. 22, 2008, now Pat. No. 8,031,176.

(51) Int. Cl.
 *G09G 5/08* (2006.01)
(52) U.S. Cl.
 USPC .............................. 345/163; 463/37
(58) Field of Classification Search
 USPC ............ 345/157, 158, 163, 166, 175; 463/37, 463/38; 178/18.09; 250/221
 See application file for complete search history.

(56) References Cited

U.S. PATENT DOCUMENTS

| 4,546,347 | A | 10/1985 | Kirsch |
| 4,799,055 | A | 1/1989 | Nestler et al. |
| 5,288,993 | A | 2/1994 | Bidiville et al. |
| 5,473,344 | A | 12/1995 | Bacon et al. |
| 5,578,813 | A | 11/1996 | Allen et al. |
| 5,644,139 | A | 7/1997 | Allen et al. |
| D382,550 | S | 8/1997 | Kaneko et al. |
| D385,542 | S | 10/1997 | Kaneko et al. |
| 5,703,356 | A | 12/1997 | Bidiville et al. |
| 5,729,008 | A | 3/1998 | Blalock et al. |
| 5,729,009 | A | 3/1998 | Daendliker et al. |
| 5,786,804 | A | 7/1998 | Gordon |
| 5,825,044 | A | 10/1998 | Allen et al. |

(Continued)

FOREIGN PATENT DOCUMENTS

| DE | 102009005092 A1 | 9/2010 |
| EP | 0404678 A | 12/1990 |

(Continued)

OTHER PUBLICATIONS

ADNB-6011-EV and ADNB-6012-EV High Performance Laser Mouse Bundles Data Sheet, Aug. 17, 2007, Avago Technologies, 52 pages.

(Continued)

*Primary Examiner* — Tom Sheng

(57) ABSTRACT

An optical navigation apparatus including a package incorporating a light source and a single die of silicon. The single die of silicon includes a photodiode array configured at the detection plane to receive the speckle pattern of the scattered light from the collection optics, circuitry configured to process signals from the photodiode array to determine changes in position of the apparatus relative to the tracking surface, analog circuitry configured to control and drive current through the light source, interface circuitry configured to communicate position data by outputting the position data via a data interface, a microcontroller comprising a processor core and memory for storing computer-readable code and data, and a system bus configured to communicate instructions and data between the microcontroller and said digital, analog, and interface circuitries. Other embodiments, aspects and features are also disclosed.

20 Claims, 6 Drawing Sheets

(56) References Cited

U.S. PATENT DOCUMENTS

| | | |
|---|---|---|
| 5,854,482 A | 12/1998 | Bidiville et al. |
| 5,907,152 A | 5/1999 | Daendliker et al. |
| 5,933,102 A | 8/1999 | Miller et al. |
| 5,963,197 A | 10/1999 | Bacon et al. |
| 5,994,710 A | 11/1999 | Knee et al. |
| 6,031,218 A | 2/2000 | Piot et al. |
| 6,037,643 A | 3/2000 | Knee |
| 6,057,540 A | 5/2000 | Gordon et al. |
| 6,097,371 A | 8/2000 | Siddiqui et al. |
| 6,151,015 A | 11/2000 | Badyal et al. |
| 6,172,354 B1 | 1/2001 | Adan et al. |
| 6,215,417 B1* | 4/2001 | Krass et al. .............. 341/20 |
| 6,225,617 B1 | 5/2001 | Daendliker et al. |
| 6,233,368 B1 | 5/2001 | Badyal et al. |
| 6,281,881 B1 | 8/2001 | Siddiqui et al. |
| 6,281,882 B1 | 8/2001 | Gordon et al. |
| 6,300,936 B1* | 10/2001 | Braun et al. ............. 345/156 |
| 6,326,950 B1 | 12/2001 | Liu |
| 6,330,057 B1 | 12/2001 | Lederer et al. |
| 6,351,257 B1 | 2/2002 | Liu |
| 6,396,479 B2 | 5/2002 | Gordon |
| 6,421,045 B1 | 7/2002 | Venkat et al. |
| 6,424,407 B1 | 7/2002 | Kinrot et al. |
| 6,433,780 B1 | 8/2002 | Gordon et al. |
| 6,452,683 B1 | 9/2002 | Kinrot et al. |
| 6,455,840 B1 | 9/2002 | Oliver et al. |
| D464,352 S | 10/2002 | Kerestegian |
| 6,462,330 B1 | 10/2002 | Venkat et al. |
| 6,476,970 B1 | 11/2002 | Smith |
| 6,529,184 B1 | 3/2003 | Julienne |
| 6,585,158 B2 | 7/2003 | Norskog |
| 6,603,111 B2 | 8/2003 | Dietz et al. |
| 6,621,483 B2 | 9/2003 | Wallace et al. |
| 6,642,506 B1 | 11/2003 | Nahum et al. |
| 6,657,184 B2 | 12/2003 | Anderson et al. |
| 6,664,948 B2 | 12/2003 | Crane et al. |
| 6,674,475 B1 | 1/2004 | Anderson |
| 6,677,929 B2 | 1/2004 | Gordon et al. |
| 6,703,599 B1 | 3/2004 | Casebolt et al. |
| 6,737,636 B2 | 5/2004 | Dietz et al. |
| 6,774,351 B2 | 8/2004 | Black |
| 6,774,915 B2 | 8/2004 | Rensberger |
| 6,795,056 B2 | 9/2004 | Norskog et al. |
| 6,809,723 B2 | 10/2004 | Davis |
| 6,819,314 B2 | 11/2004 | Black |
| 6,823,077 B2 | 11/2004 | Dietz et al. |
| 6,859,196 B2* | 2/2005 | Kehlstadt ................ 345/156 |
| 7,030,860 B1 | 4/2006 | Hsu et al. |
| 7,042,575 B2 | 5/2006 | Carlisle et al. |
| 7,116,117 B2 | 10/2006 | Nakano et al. |
| 7,199,350 B2 | 4/2007 | Chien |
| 7,274,808 B2 | 9/2007 | Baharav et al. |
| 7,295,186 B2 | 11/2007 | Brosnan |
| 7,420,542 B2* | 9/2008 | Butterworth et al. ......... 345/166 |
| 7,525,082 B2* | 4/2009 | Itagaki ................... 250/221 |
| 7,557,338 B2 | 7/2009 | Gruhlke et al. |
| 8,031,176 B1* | 10/2011 | Sanders et al. .............. 345/166 |
| 8,111,344 B2* | 2/2012 | Moon et al. ................ 349/48 |
| 8,400,409 B1 | 3/2013 | Francis |
| 2002/0130835 A1 | 9/2002 | Brosnan |
| 2002/0158300 A1 | 10/2002 | Gee |
| 2002/0190953 A1 | 12/2002 | Gordon et al. |
| 2003/0034959 A1 | 2/2003 | Davis et al. |
| 2004/0084610 A1 | 5/2004 | Leong et al. |
| 2004/0189593 A1 | 9/2004 | Koay |
| 2004/0208348 A1 | 10/2004 | Baharav et al. |
| 2005/0024336 A1 | 2/2005 | Xie et al. |
| 2005/0024623 A1 | 2/2005 | Xie et al. |
| 2005/0083303 A1 | 4/2005 | Schroeder et al. |
| 2005/0248534 A1* | 11/2005 | Kehlstadt ................ 345/163 |
| 2007/0052684 A1 | 3/2007 | Gruhlke et al. |
| 2007/0075710 A1 | 4/2007 | Hargreaves et al. |
| 2007/0215793 A1 | 9/2007 | Gruhlke et al. |
| 2008/0006762 A1 | 1/2008 | Fadell et al. |
| 2008/0094356 A1 | 4/2008 | Ording et al. |
| 2010/0302208 A1 | 12/2010 | Brosnan et al. |
| 2011/0018840 A1 | 1/2011 | Fann et al. |
| 2012/0002693 A1 | 1/2012 | Hasegawa et al. |

FOREIGN PATENT DOCUMENTS

| | | |
|---|---|---|
| EP | 2387744 A1 | 11/2011 |
| GB | 2400713 A | 10/2004 |
| JP | 2004318890 A | 11/2004 |
| KR | 20110051165 A | 5/2011 |
| WO | 2010081652 A | 7/2010 |

OTHER PUBLICATIONS

ADNB-6532 Small Form Factor Laser Stream Mouse Bundle Data Sheet, Nov. 10, 2006, Avago Technologies, 44 pages.

ADNK-6013 Optical Mouse Designer's Kit Design Guide, Mar. 30, 2006, Avago Technologies, 24 pages.

USPTO Non-Final Rejection for U.S. Appl. No. 12/009,863 dated Dec. 8, 2010; 13 pages.

USPTO Notice of Allowance for U.S. Appl. No. 12/009,863 dated May 26, 2011; 5 pages.

U.S. Appl. No. 13/248,355 (CD11027) "Optical Navigation Module With Capacitive Sensor," Jinghui Mu et al., filed Sep. 29, 2011; 33 pages.

U.S. Appl. No. 13/307,350 (CD11103): "Hybrid Sensor Module" Yansun Xu et al., filed Nov. 30, 2011; 31 pages.

KIPO ISR/WO for Application No. PCT/US2011/053552 (CD11027W0) dated May 23, 2012; 10 pages.

USPTO Advisory Action for U.S. Appl. No. 12/218,021 (CD07194) dated Nov. 7, 2011; 3 pages.

USPTO Advisory Action for U.S. Appl. No. 12/218,021 (CD07194) dated May 9, 2012; 3 pages.

USPTO Final Rejection for U.S. Appl. No. 12/218,021 (CD07194) dated Feb. 22, 2012; 45 pages.

USPTO Final Rejection for U.S. Appl. No. 12/218,021 (CD07194) dated Aug. 29, 2011; 41 pages.

USPTO Non Final Rejection for U.S. Appl. No. 13/307,350 (CD11103) dated Aug. 23, 2013; 10 pages.

USPTO Non-Final Rejection for U.S. Appl. No. 12/218,021 (CD07194) dated Apr. 27, 2011; 34 pages.

USPTO Notice of Allowance for U.S. Appl. No. 12/218,021 (CD07194) dated Jan. 30, 2013; 9 pages.

USPTO Notice of Allowance for U.S. Appl. No. 12/218,021 (CD07194) dated Oct. 5, 2012; 9 pages.

\* cited by examiner

OPTICAL NAVIGATION SYSTEM USING A SINGLE-PACKAGE MOTION SENSOR

RELATED APPLICATIONS

This application is a continuation of U.S. Non-Provisional application Ser. No. 12/009,863 filed Jan. 22, 2008, now U.S. Pat. No. 8,031,176 issued Oct. 4, 2011 which is incorporated herein by reference in its entirety.

TECHNICAL FIELD

The present invention relates generally to apparatus and methods of packaging optical navigation sensors.

BACKGROUND OF THE INVENTION

Pointing devices, such as computer mice or trackballs, are utilized for inputting data into and interfacing with personal computers and workstations. Such devices allow rapid relocation of a cursor on a monitor, and are useful in many text, database and graphical programs. A user controls the cursor, for example, by moving the mouse over a surface to move the cursor in a direction and over distance proportional to the movement of the mouse. Alternatively, movement of the hand over a stationary device may be used for the same purpose.

Computer mice come in both optical and mechanical versions. Mechanical mice typically use a rotating ball to detect motion, and a pair of shaft encoders in contact with the ball to produce a digital signal used by the computer to move the cursor. One problem with mechanical mice is that they are prone to inaccuracy and malfunction after sustained use due to dirt accumulation, and such. In addition, the movement and resultant wear of the mechanical elements, particularly the shaft encoders, necessarily limit the useful life of the device.

One solution to the above-discussed with mechanical mice problems has been the development of optical mice. Optical mice have become very popular because they are more robust and may provide a better pointing accuracy.

One approach used for optical mice relies on a light emitting diode (LED) illuminating a surface at or near grazing incidence, a two-dimensional CMOS (complementary metal-oxide-semiconductor) detector which captures the resultant images, and software that correlates successive images to determine the direction, distance and speed the mouse has been moved. This technology typically provides high accuracy but suffers from a complex design and relatively high image processing requirements. In addition, the optical efficiency is low due to the grazing incidence of the illumination.

Another approach differs from the standard technology in that it uses a coherent light source, such as a laser. Light from a coherent source scattered off of a rough surface generates a random intensity distribution of light known as speckle.

SUMMARY

One embodiment disclosed relates to an optical navigation apparatus including a package incorporating a light source for generating light and a single die of silicon including circuitry configured thereon. The apparatus further includes illumination optics configured to illuminate a tracking surface with the light from the light source, and collection optics configured to collect scattered light from the tracking surface so as to form a speckle pattern at a detection plane. The single die of silicon includes a photodiode array configured at the detection plane to receive the speckle pattern of the scattered light from the collection optics, circuitry configured to process signals from the photodiode array to determine changes in position of the apparatus relative to the tracking surface, analog circuitry configured to control and drive current through the light source, interface circuitry configured to communicate position data by ontputting the position data via a data interface, a microcontroller comprising a processor core and memory for storing computer-readable code and data, and a system bus configured to communicate instructions and data between the microcontroller and said digital, analog, and interface circuitries.

Other embodiments, aspects and features are also disclosed.

BRIEF DESCRIPTION OF THE DRAWINGS

These and various other features and advantages of the present disclosure are understood more fully from the detailed description that follows and from the accompanying drawings, which, however, should not be taken to limit the appended claims to the specific embodiments shown, but are for explanation and understanding only.

DETAILED DESCRIPTION

Figure 1:
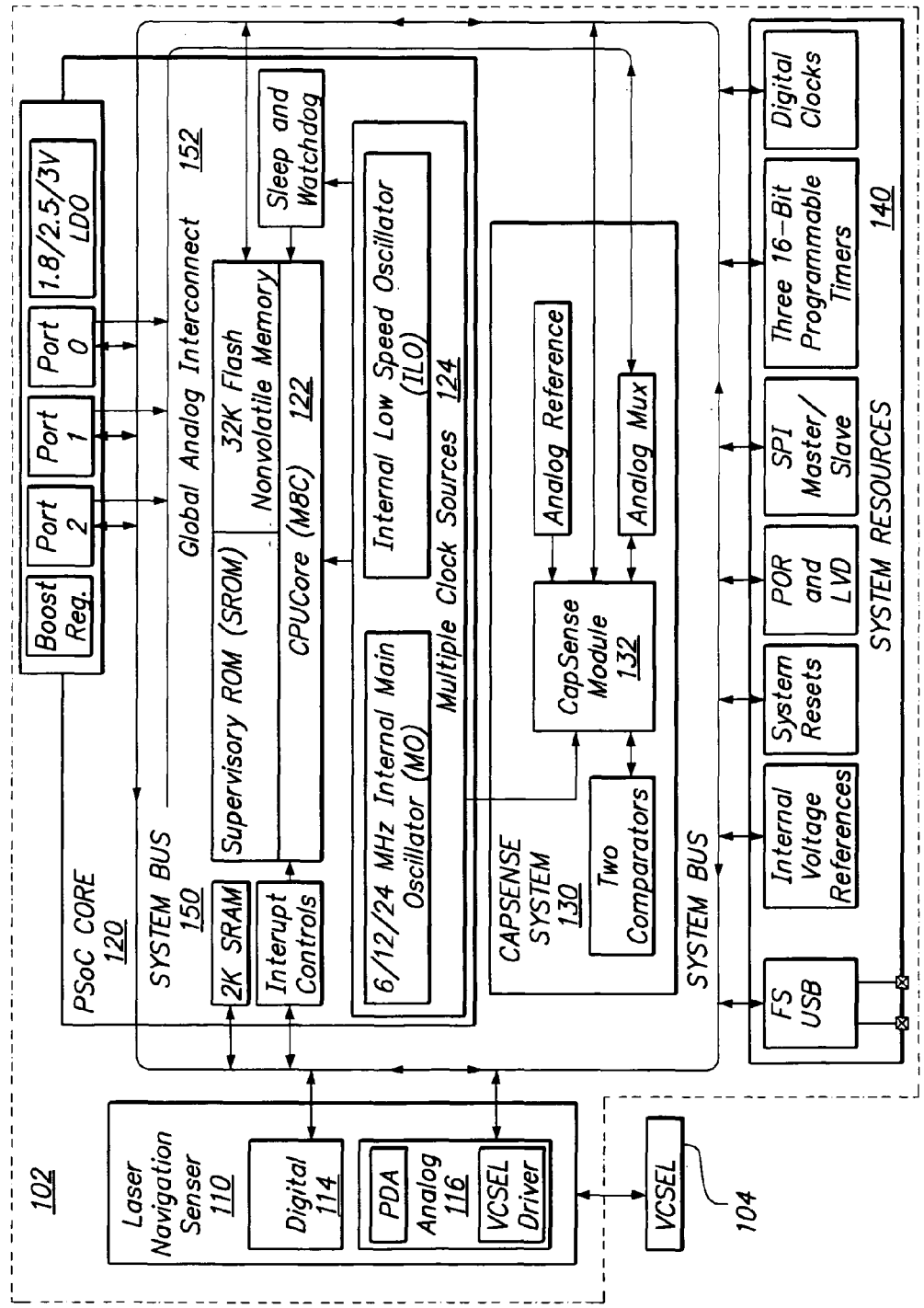
FIG. 1 is a schematic diagram of an optical navigation system using a single-package motion sensor and a light source in accordance with an embodiment of the invention.

FIG. 1 is a schematic diagram of an optical navigation system using a single-package motion sensor (a packaged silicon die) 102 and a light source 104 in accordance with an embodiment of the invention. Although the light source 104 is shown separate from the silicon die of the motion sensor 102 in FIG. 1, the light source 104 may be integrated with the sensor package (for example, bonded to the surface of the silicon die of the motion sensor) such that no calibration or alignment is needed during assembly of the computer mouse.

In the illustrated embodiment, the light source 104 is a VCSEL (vertical-cavity surface-emitting laser). For example, the VCSEL may be implemented so as to output laser light at a wavelength of between 840 to 870 nm with about 0.5 mW of power at room temperature.

The motion sensor 102 has multiple components integrated onto a single packaged silicon die. In the illustrated embodiment, the single-package motion sensor 102 includes a laser navigation sensor component 110, a PSoC® (Programmable System-On-Chip) Core 120, a capacitive sensing system (CapSense System) 130, system resources 140, a system bus 150, and global analog interconnect 152.

As shown, the system bus 150 may be configured to interconnect and communicate data between the laser navigation sensor component 110, the PSoC® Core 120, the capacitive sensing system (CapSense System), and the system resources 140. As further shown, the global analog interconnect 152 may be configured to interconnect and communicate analog signals between analog input ports (see Ports 0, 1 and 2 in FIG. 1) and the capacitive sensing system 130.

The laser navigation sensor 110 includes both digital 114 and analog 116 circuitry. The analog circuitry 116 includes driver circuitry (VCSEL Driver) to drive the light source (VCSEL 104) and also the photodiode array (PDA). In one embodiment of the invention, the PDA may be wired as a comb array. In particular, the PDA may be wired as a two-dimensional comb array, as described further below in relation to FIG. 5.

As shown, the PSoC core 120 may include a CPU (central processing unit) core 122, memory components (including, for example, SRAM or static random access memory for data storage, SROM or supervisory read only memory, and flash nonvolatile memory), an interrupt controller, sleep and watchdog timers, and multiple clock sources 124. The CPU core 122 may be configured, for example, as an 8-bit Harvard architecture processor with processor speeds running to 24 MHz.

The multiple clock sources 124 may include, for example, an internal main oscillator (IMO) which is configured to output clock signals at 6, 12, and 24 MHz. The multiple clock sources 124 may also include, for example, an internal low-speed oscillator (ILO) which is configured to output a clock signal at 32 kHz for use by the watchdog and sleep timers.

As further shown, digital and analog inputs and outputs may be provided by way of input/output ports (see Port 0, Port 1 and Port 2). A boost regulator and a 1.8/2.5/3.0 volt low dropout (LDO) regulator may also be provided.

In accordance with an embodiment of the invention, the digital inputs and outputs are reconfigurable using internally-stored firmware (i.e. computer-readable instructions stored in non-volatile memory), and the microcontroller is configured to process the signals from the reconfigurable digital inputs. In further accordance with an embodiment of the invention, the analog inputs and outputs are also reconfigurable using internally-stored firmware (i.e. computer-readable instructions stored in non-volatile memory).

In one implementation, the reconfigurable inputs are configured to receive button press data. In another implementation, the reconfigurable inputs are configured to receive scroll wheel input data. The reconfigurable outputs may be configured, for example, to control and power external indicators, such as light emitting diode indicators. Battery charging and monitoring may be implemented by configuration of the analog inputs and outputs for such charging and monitoring.

The capacitive sensor system 130 is configured to perform capacitive sensing and scanning using comparator circuits without requiring external components. In one embodiment, capacitive sensing may be configurable on each of the input/output ports. The capacitive sensor system 130 includes a capacitive sensor module 132 which is communicatively coupled to the system bus 150 and is further coupled to receive a clock signal or signals from the multiple clock sources 124 and to receive an analog reference signal. An analog multiplexer component couples the capacitive sensing module 132 to the global analog interconnect 152.

In accordance with one embodiment, the capacitive sensing system 130 may be configured to process signals and output data to said reconfigurable inputs. In one implementation, the capacitive sensor circuitry is used to process signals for scroll wheel operation. In another implementation, the capacitive sensor circuitry is used to wake-up a mouse device upon a user touch. In other words, the capacitive sensor circuitry may be used to sense the proximity or touch of a user's hand to trigger the mouse device's transition from a low-power state to an active state.

The system resources 140 may include, for example, circuitry for a full-speed Universal Serial Bus (FS USB) interface, internal voltage references, system resets, power on reset (POR) and low voltage detection (LVD). In addition, the system resources 140 may also include, for example, Serial Peripheral Interface (SPI) master and slave circuits (which may be configurable, for example, between 46.9 kHz to 3 MHz), programmable timers (for example, three 16-bit timers), and digital clock circuits.

Figure 2:
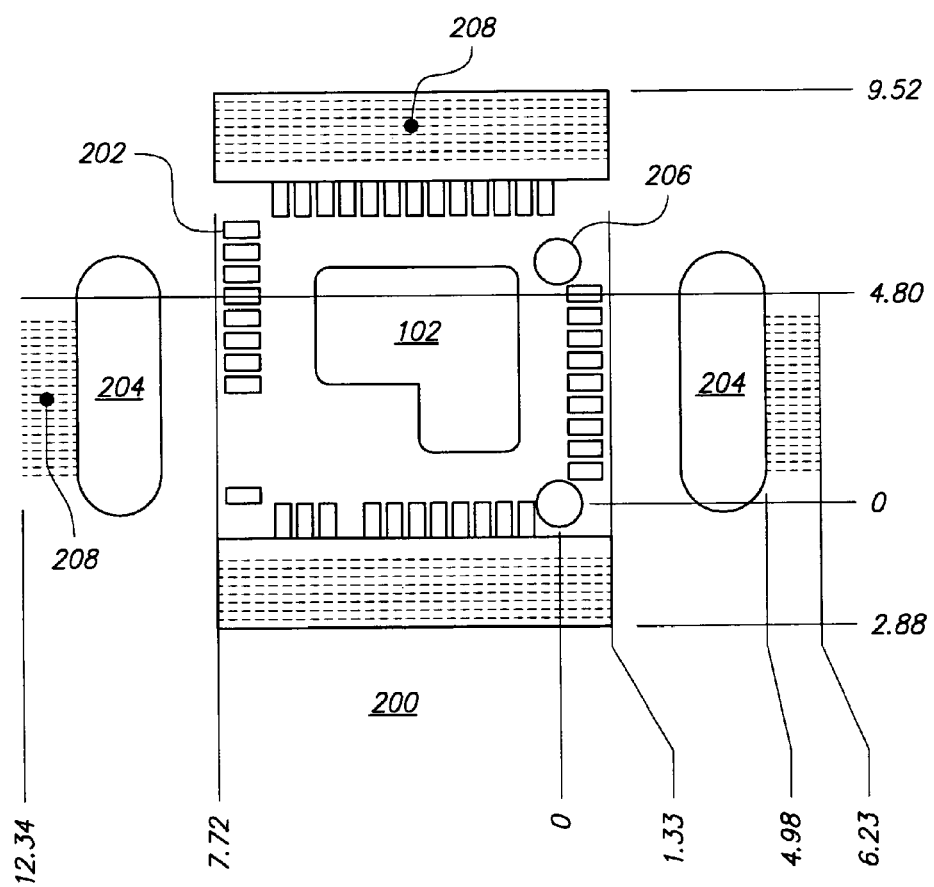
FIG. 2 is a layout of a printed circuit board for an optical navigation system in accordance with an embodiment of the invention.

FIG. 2 is a layout of a printed circuit board (PCB) 200 for an optical navigation system in accordance with an embodiment of the invention. The PCB layout shows a placement of the packaged silicon die for the motion sensor 102 and associated contact pads 202 for input/output, power, and so forth. In addition, opening features 204 for connecting a self-aligning snap-on molded optic 304 (see FIG. 3) is shown, as well as alignment features 206 for aligning the molded optic 304 to the PCB 200. Keep out zones 208 which relate to the molded optic 304 are also shown. Also shown are horizontal dimensions (going from −12.34 mm to +6.23 mm) and vertical dimensions (going from −2.88 mm to +9.52 mm).

Figure 3:
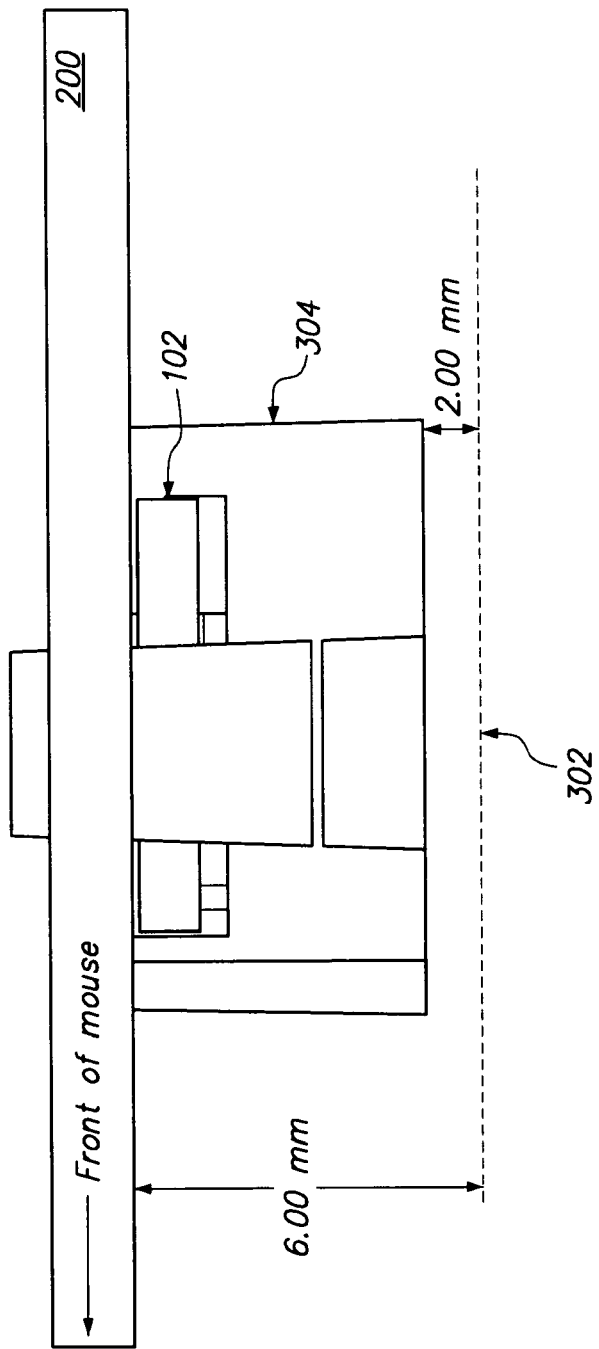
FIG. 3 is a side view showing a single-package motion sensor for an optical navigation system in accordance with an embodiment of the invention.

FIG. 3 is a side view showing a single-package motion sensor for an optical navigation system in accordance with an embodiment of the invention. The packaged silicon die 102 is shown mounted to the printed circuit board 200. The optical navigation apparatus is configured so that the printed circuit board 200 is a predetermined distance (in this case, 6 mm) from a tracking surface 302 when the apparatus is in normal operation. As shown, a molded optic (i.e. a molded lens) 304 is attached to the printed circuit board 200.

Figure 4:
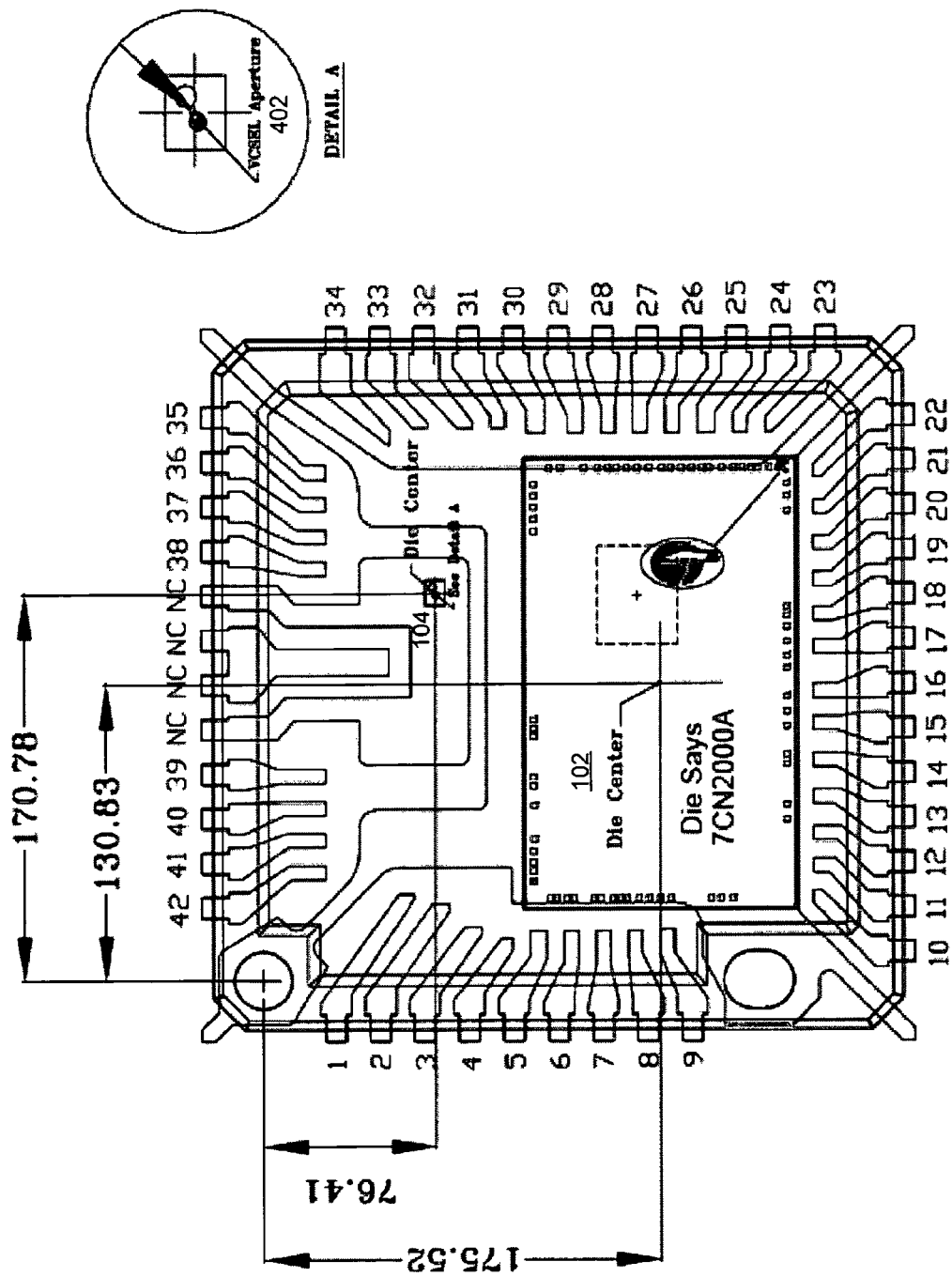
FIG. 4 is a die mount layout for a single-package motion sensor and a light source in accordance with an embodiment of the invention.

FIG. 4 is a die mount layout for a single-package motion sensor 102 and a light source (in this case, a VCSEL) 104 in accordance with an embodiment of the invention. Of particular interest, an optical aperture 402 for the VCSEL is shown in the die mount layout. In accordance with an embodiment of the invention, this optical aperture 402 is configured to control a spatial frequency distribution of the laser speckle detected by the photodiode array. Also shown are horizontal and vertical distances (in mils, a mil being 0.001 inches) from the center of each die to an alignment feature on the die mount.

Figure 5:
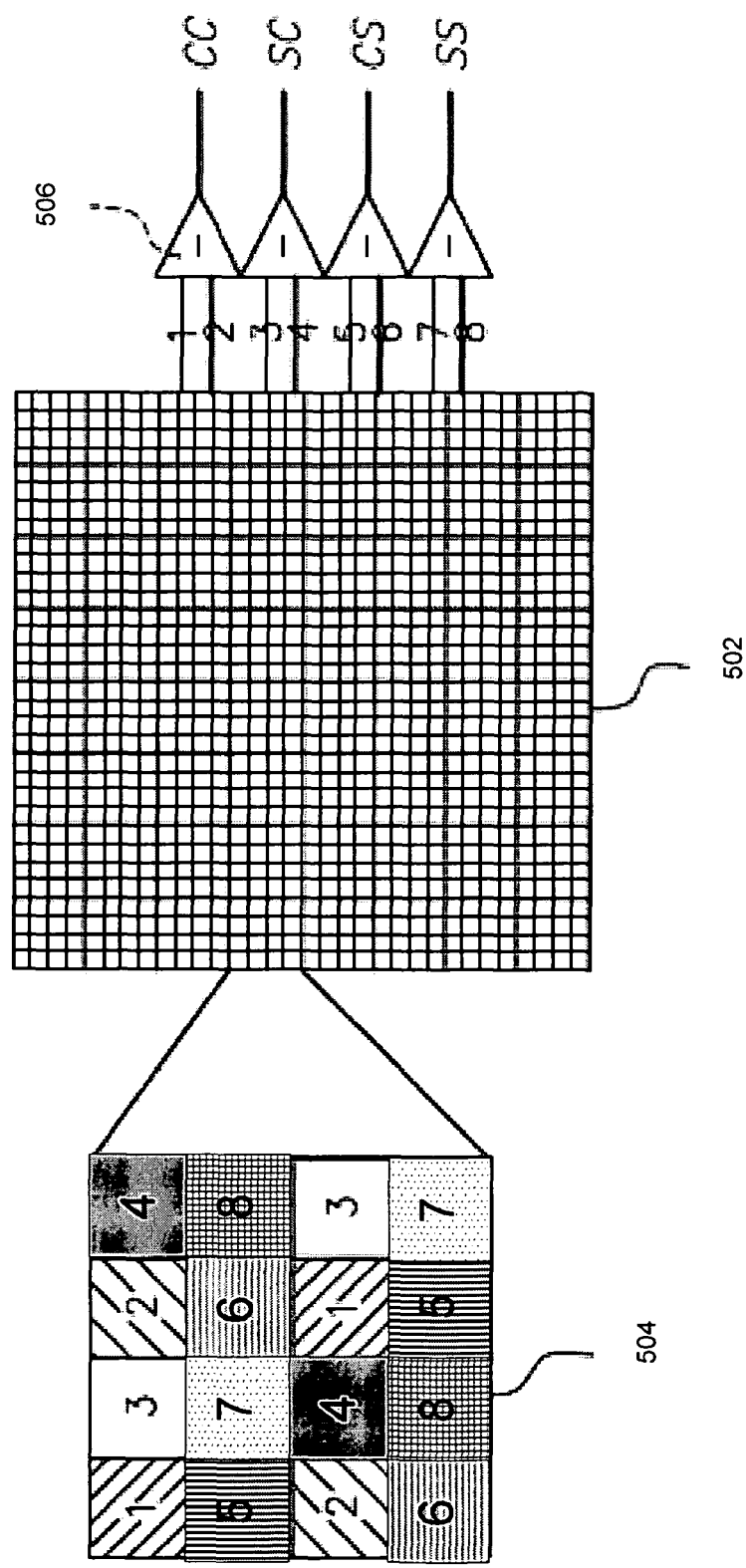
FIG. 5 is a schematic diagram of a two-dimensional comb array in accordance with an embodiment of the invention.

FIG. 5 is a schematic diagram of a two-dimensional comb array in accordance with an embodiment of the invention. An example two-dimensional array 502 of photodiode detector elements is shown. The 2D array 502 is made up of 64 sub-arrays 504 organized in an 8-by-8 matrix. An expanded view of one such sub-array 504 is shown on the left side of the figure.

Each sub-array 504 comprises 16 detector elements organized in a 4-by-4 matrix. The 16 detector elements in each sub-array 504 are each identified as being a member of one of eight groups of elements. The group number associated with each detector element of each sub-array 504 is shown by the number (1, 2, 3, 4, 5, 6, 7, or 8) labeling the element in the expanded view. The signals from each group are electrically ganged together for the entire array 502. The resultant group signals (numbered 1 through 8) are output from the array 502 (as shown on the right side of the figure).

Differential circuitry 506 is used to generate differential signals from pairs of the group signals. A first differential signal CC is generated by the difference of signals 1 and 2. A second differential signal SC is generated by the difference of signals 3 and 4. A third differential signal CS is generated by the difference of signals 5 and 6. A fourth differential signal SS is generated by the difference of signals 7 and 8. These four differential signals contain the information of the in-phase and quadrature signals in the x and y directions.

One embodiment disclosed relates to an optical navigation apparatus including a package incorporating a light source 104 for generating light and a single die of silicon 102 including circuitry configured thereon. The apparatus further includes illumination optics (molded optic 304) configured to illuminate a tracking surface with the light from the light source, and collection optics (also molded optic 304) configured to collect scattered light from the tracking surface so as to form a speckle pattern at a detection plane. The single die of silicon 102 includes a photodiode array (PDA) configured at the detection plane to receive the speckle pattern of the scattered light from the collection optics, digital circuitry 114 configured to process signals from the photodiode array to determine changes in position of the apparatus relative to the tracking surface, analog circuitry 116 configured to control and drive current through the light source, interface circuitry (for example, full-speed USB) configured to communicate position data by outputting the position data via a data interface, a microcontroller comprising a processor core 122 and memory for storing computer-readable code and data, and a system bus 152 configured to communicate instructions and data between the microcontroller and said digital, analog, and interface circuitries.

Figure 6:
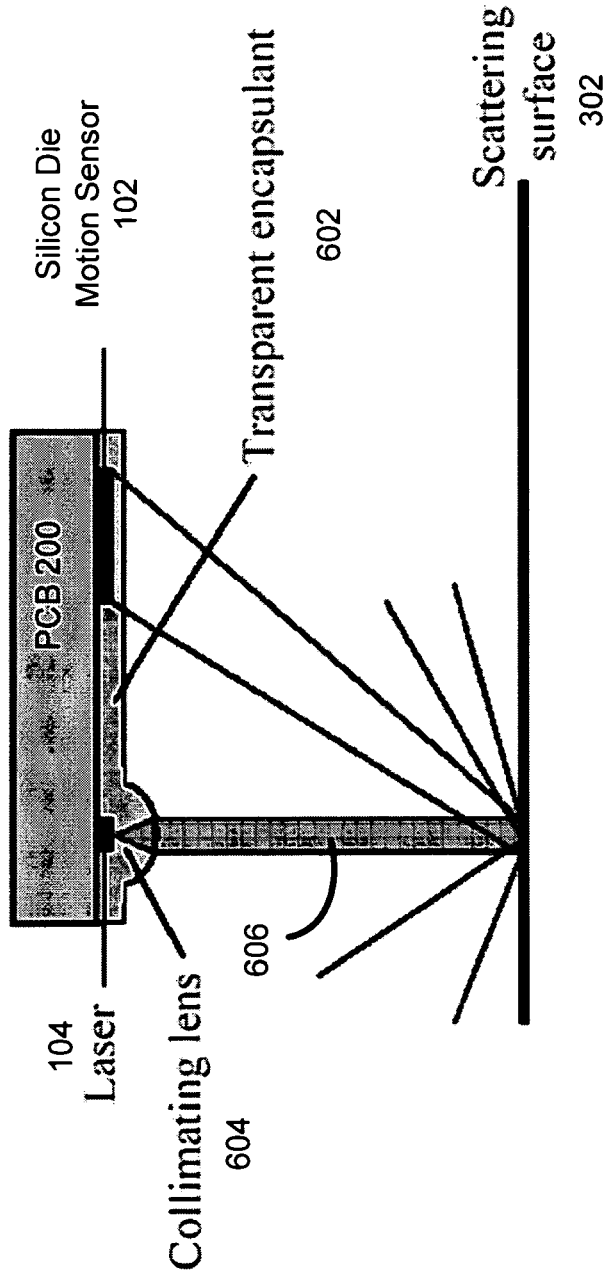
FIG. 6 is a cross-sectional diagram showing an optical navigation apparatus with a lens (illumination optic) integrated into a package in accordance with an embodiment of the invention.

FIG. 6 is a cross-sectional diagram of an optical navigation apparatus over a surface in accordance with an embodiment of the invention. As shown, the optical navigation apparatus includes a printed circuit board 200, a silicon die motion sensor 102, and a laser emitter 104. The laser 104 emits coherent light 606 towards the scattering surface 302.

In addition, this embodiment includes a molded transparent plastic encapsulant 602 that is part of the packaging of the silicon die motion sensor 102, the packaging being mounted to the PCB 200. The transparent encapsulant 602 also embodies the collimating lens 604 as an integral part of the packaging of the silicon die motion sensor 102 and the laser 104. Note that collection optics are not necessarily needed in this architecture as the scattered light may be detected by the sensor 102 without any imaging lenses for that purpose. The transparent encapsulant 602 also serves to protect the laser emitter 104 and the silicon die motion sensor 102. In another implementation, the collimating lens 604 may be a part which is plugged into the packaging of the silicon die motion sensor 102. In accordance with a specific implementation, the collimating lens 604 is configured in proximity to the laser 104 so as to receive the coherent light and to form a collimated illumination beam 606 therefrom.

The foregoing description of specific embodiments and examples of the invention have been presented for the purpose of illustration and description, and although the invention has been described and illustrated by certain of the preceding examples, it is not to be construed as being limited thereby. They are not intended to be exhaustive or to limit the invention to the precise forms disclosed, and many modifications, improvements and variations within the scope of the invention are possible in light of the above teaching. It is intended that the scope of the invention encompass the generic area as herein disclosed, and by the claims appended hereto and their equivalents.

What is claimed is:

1. A user interface apparatus comprising:
   a package that includes a single die including thereon:
   optical navigation sensor circuitry configured to translate changes in a light pattern propagated from a tracking surface relative to which the user interface apparatus is moved into data representing motion of the user interface apparatus relative to the tracking surface; and
   capacitive sensor circuitry configured to sense a user's hand proximate to a surface of the user interface apparatus to process signals and output data relative thereto, the capacitive sensor circuitry configured to perform capacitive sensing without components external to the single die.

2. The user interface apparatus of claim 1, wherein the optical navigation sensor circuitry comprises a photodiode array to detect the light pattern propagated onto the photodiode array from the tracking surface, and a signal processor to translate changes in the light pattern propagated onto the photodiode array into data representing motion of the user interface apparatus relative to the tracking surface.

3. The user interface apparatus of claim 1, further comprising a light source to illuminate at least a portion of tracking surface, and wherein the optical navigation sensor circuitry further includes driver circuitry to drive the light source.

4. The user interface apparatus of claim 3, wherein the light source is included within the package.

5. The user interface apparatus of claim 1, wherein the capacitive sensor circuitry includes circuitry configured to sense proximity of the user's hand to trigger a transition of the user interface apparatus from a low-power state to an active state.

6. The user interface apparatus of claim 1, wherein the user interface apparatus comprises a mouse including buttons, and wherein the capacitive sensor circuitry is configured to sense pressing of buttons on the mouse.

7. The user interface apparatus of claim 1, wherein the light pattern comprises a speckle pattern formed from light scattered from the tracking surface.

8. An optical navigation apparatus comprising:
   a package that includes a single die including thereon:
   optical navigation sensor circuitry configured to translate changes in a light pattern propagated from a tracking surface relative to which the optical navigation apparatus is moved into data representing motion of the optical navigation apparatus relative to the tracking surface;
   capacitive sensor circuitry configured to sense a user's hand proximate to a surface of the optical navigation apparatus to process signals and output data relative thereto, the capacitive sensor circuitry configured to perform capacitive sensing without components external to the single die; and
   a microcontroller to process signals from the optical navigation sensor circuitry and capacitive sensor circuitry, the microcontroller including a processor core, memory for storing computer-readable code and data, and a number of inputs and outputs for the optical navigation apparatus.

9. The optical navigation apparatus of claim 8, wherein the optical navigation sensor circuitry comprises a photodiode array to detect the light pattern propagated onto the photodiode array from the tracking surface, and a signal processor to translate changes in the light pattern propagated onto the photodiode array into data representing motion of the optical navigation apparatus relative to the tracking surface.

10. The optical navigation apparatus of claim 8, further comprising a light source to illuminate at least a portion of tracking surface, and wherein the optical navigation sensor circuitry further includes driver circuitry to drive the light source.

11. The optical navigation apparatus of claim 8, wherein the capacitive sensor circuitry includes circuitry configured to sense proximity of the user's hand to trigger a transition of the optical navigation apparatus from a low-power state to an active state.

12. The optical navigation apparatus of claim 8, wherein the optical navigation apparatus comprises a mouse including buttons, and wherein the capacitive sensor circuitry is configured to sense pressing of buttons on the mouse.

13. The optical navigation apparatus of claim 8, wherein the number of inputs and outputs are reconfigurable using computer-readable code stored in the memory of the microcontroller.

14. The optical navigation apparatus of claim 8, wherein the light pattern comprises a speckle pattern formed from light scattered from the tracking surface.

15. A method of manufacturing an apparatus comprising:
providing a light source to illuminate a tracking surface;
providing a single die including thereon optical navigation sensor circuitry comprising a photodiode array to detect a light pattern propagated onto the photodiode array from the tracking surface, and a signal processor to translate changes in the light pattern propagated onto the photodiode array into data representing motion of the apparatus relative to the tracking surface, capacitive sensor circuitry comprising circuitry to sense user's hand proximate to a surface of the apparatus to process signals and output data relative thereto without components external to the single die, and a microcontroller to process signals from the optical navigation sensor circuitry and capacitive sensor circuitry, the microcontroller including a processor core, memory for storing computer-readable code and data, and a number of inputs and outputs for the apparatus; and
packaging the single die, wherein the packaging incorporates illumination optics configured to illuminate the tracking surface with the light from the light source.

16. The method of claim 15, wherein providing the single die including optical navigation sensor circuitry comprises providing optical navigation sensor circuitry configured to drive the light source.

17. The method of claim 15, wherein providing the single die including capacitive sensor circuitry comprises providing capacitive sensor circuitry configured to sense proximity of the user's hand to trigger a transition of the apparatus from a low-power state to an active state.

18. The method of claim 15, wherein the packaging incorporates illumination optics configured to illuminate the tracking surface with the light from the light source.

19. The method of claim 15, wherein the light pattern comprises a speckle pattern formed from light scattered from the tracking surface.

20. The method of claim 15, further comprising configuring the number of inputs and outputs using computer-readable code stored in the memory of the microcontroller.

* * * * *